United States Patent [19]

Mimura et al.

[11] Patent Number: 5,154,471
[45] Date of Patent: Oct. 13, 1992

[54] AUTOMOBILE WINDOW MOLDING ASSEMBLY

[75] Inventors: Hirotoshi Mimura; Masaaki Mitsuki; Sakae Fujioka, all of Yokohama, Japan

[73] Assignee: Hashimoto Forming Industry Co., Ltd., Japan

[21] Appl. No.: 815,912

[22] Filed: Jan. 2, 1992

Related U.S. Application Data

[63] Continuation of Ser. No. 623,500, Dec. 7, 1990, abandoned.

[30] Foreign Application Priority Data

Dec. 7, 1989 [JP] Japan .................................. 1-141853
Dec. 7, 1989 [JP] Japan .................................. 1-141854
Mar. 30, 1990 [JP] Japan .................................. 2-35256

[51] Int. Cl.⁵ .......................................... B60J 10/02
[52] U.S. Cl. ............................... 296/93; 52/208; 52/209
[58] Field of Search ................ 296/93, 200, 201, 208; 52/208, 209

[56] References Cited

U.S. PATENT DOCUMENTS

| | | | |
|---|---|---|---|
| 4,389,069 | 6/1983 | Sengoku | 296/93 X |
| 4,401,340 | 8/1983 | Ankrapp et al. | 296/93 |
| 4,757,659 | 7/1988 | Miyakawa et al. | |
| 4,757,660 | 7/1988 | Miyakawa et al. | |
| 4,833,847 | 5/1989 | Inayama et al. | 296/93 X |
| 4,950,019 | 8/1990 | Gross | 296/93 |
| 5,035,459 | 7/1991 | Yada | 296/93 |
| 5,039,157 | 8/1991 | Yada | 296/93 |
| 5,094,498 | 3/1992 | Yada | 296/93 |

FOREIGN PATENT DOCUMENTS

| | | | |
|---|---|---|---|
| 310262 | 4/1989 | European Pat. Off. | 296/93 |
| 3612923 | 10/1987 | Fed. Rep. of Germany | 296/93 |
| 80917 | 5/1982 | Japan | 296/93 |
| 80918 | 5/1982 | Japan | 296/93 |
| 57-54416 | 11/1982 | Japan . | |
| 191815 | 9/1985 | Japan | 296/201 |
| 199720 | 10/1985 | Japan | 296/201 |
| 15118 | 1/1987 | Japan | 296/201 |
| 157823 | 7/1987 | Japan | 296/93 |
| 63-184117 | 11/1988 | Japan . | |
| 291721 | 11/1988 | Japan | 296/93 |
| 12913 | 1/1989 | Japan | 296/93 |
| 1-82117 | 7/1989 | Japan | 296/201 |
| 1-90528 | 7/1989 | Japan | 296/93 |
| 202518 | 8/1989 | Japan | 296/93 |
| 2078289 | 1/1982 | United Kingdom | 296/93 |
| 2219338 | 12/1989 | United Kingdom | 296/93 |

*Primary Examiner*—Russell D. Stormer
*Assistant Examiner*—Gary C. Hoge
*Attorney, Agent, or Firm*—Stevens, Davis, Miller & Mosher

[57] ABSTRACT

An automobile window molding assembly includes an elongate outer ornamental member or trimming member which is secured to an automobile body panel by fastener members. The ornamental or trimming member is formed of a profiled metal member for covering a gap between a body panel and upper and side edges of a window plate mounted on the body panel. The ornamental or trimming member has upper and side portions to extend along the upper and side edges of a window plate, respectively, and a corner portion between the upper and side portions for integrally connecting them with each other. The ornamental or trimming member has such a predetermined profile that, when the assembly is mounted in place, the ornamental or trimming member is in abutment with outer surface of the window plate along the upper portion while it is spaced from the outer surface of the window plate along the side portion. A weir member is secured to the ornamental or trimming member to form a weir between the outer surface of the window plate and the ornamental or trimming member along the side portion.

8 Claims, 12 Drawing Sheets

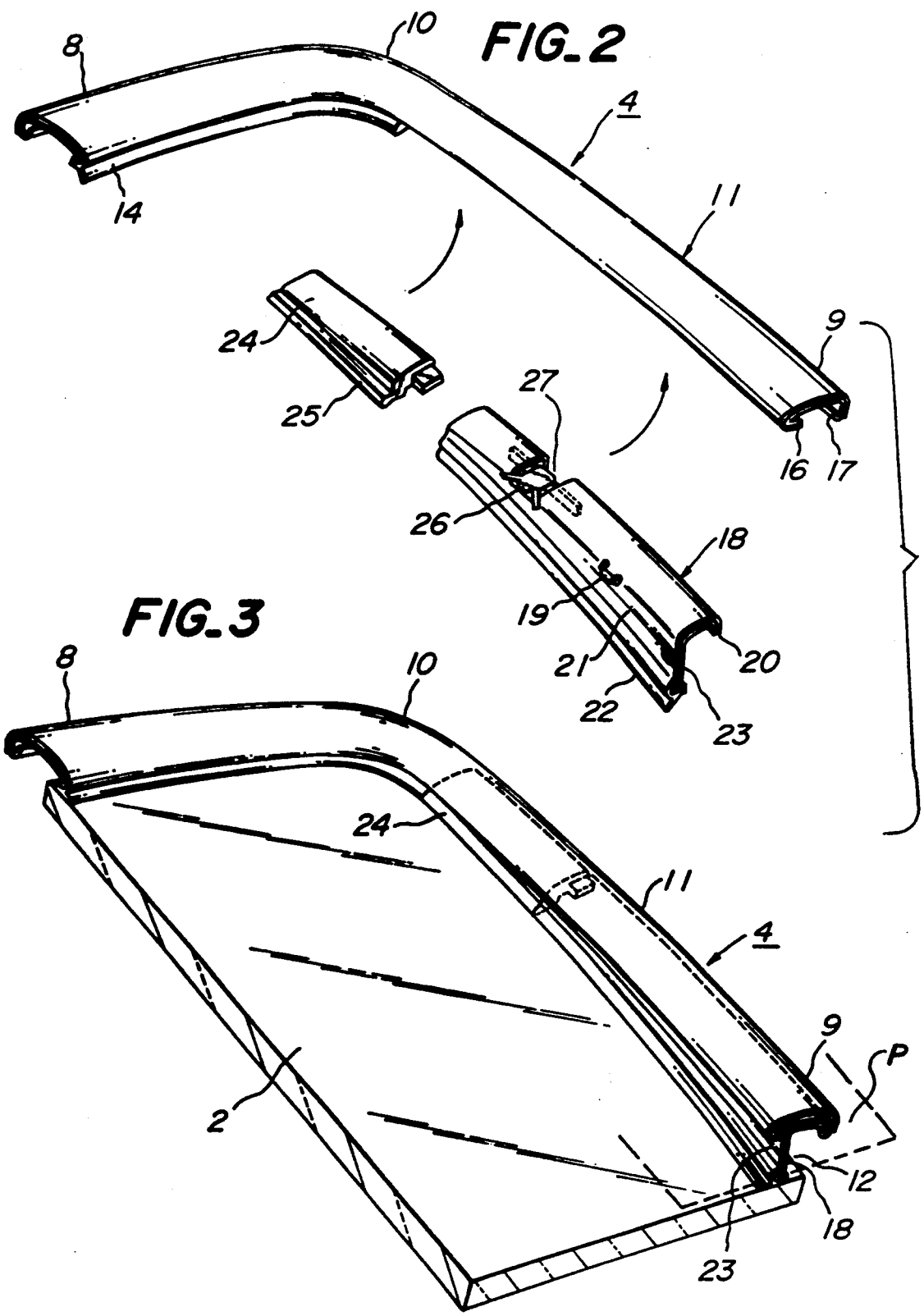

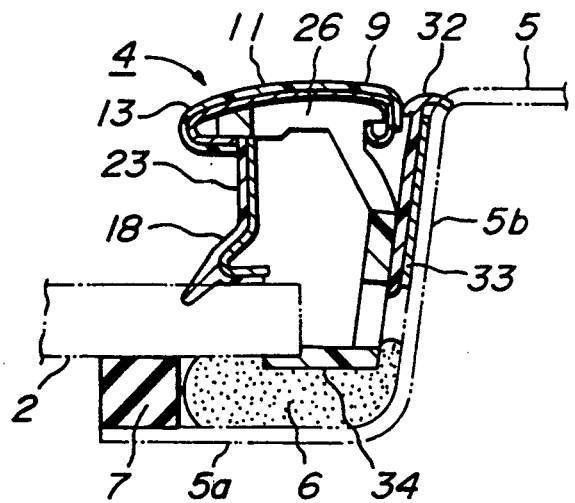
FIG_6
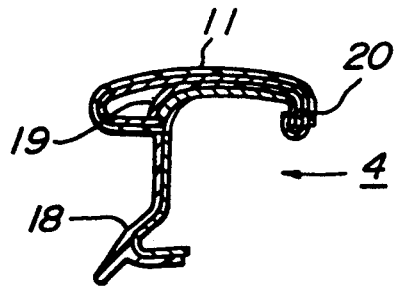
FIG_7
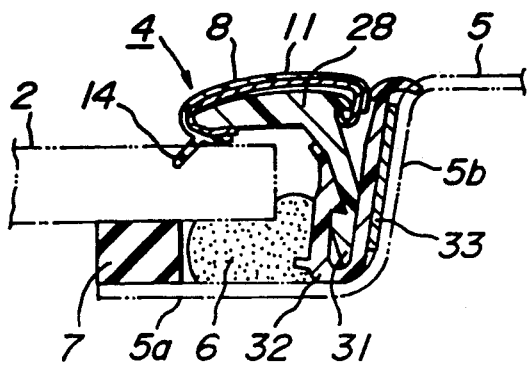
FIG_8

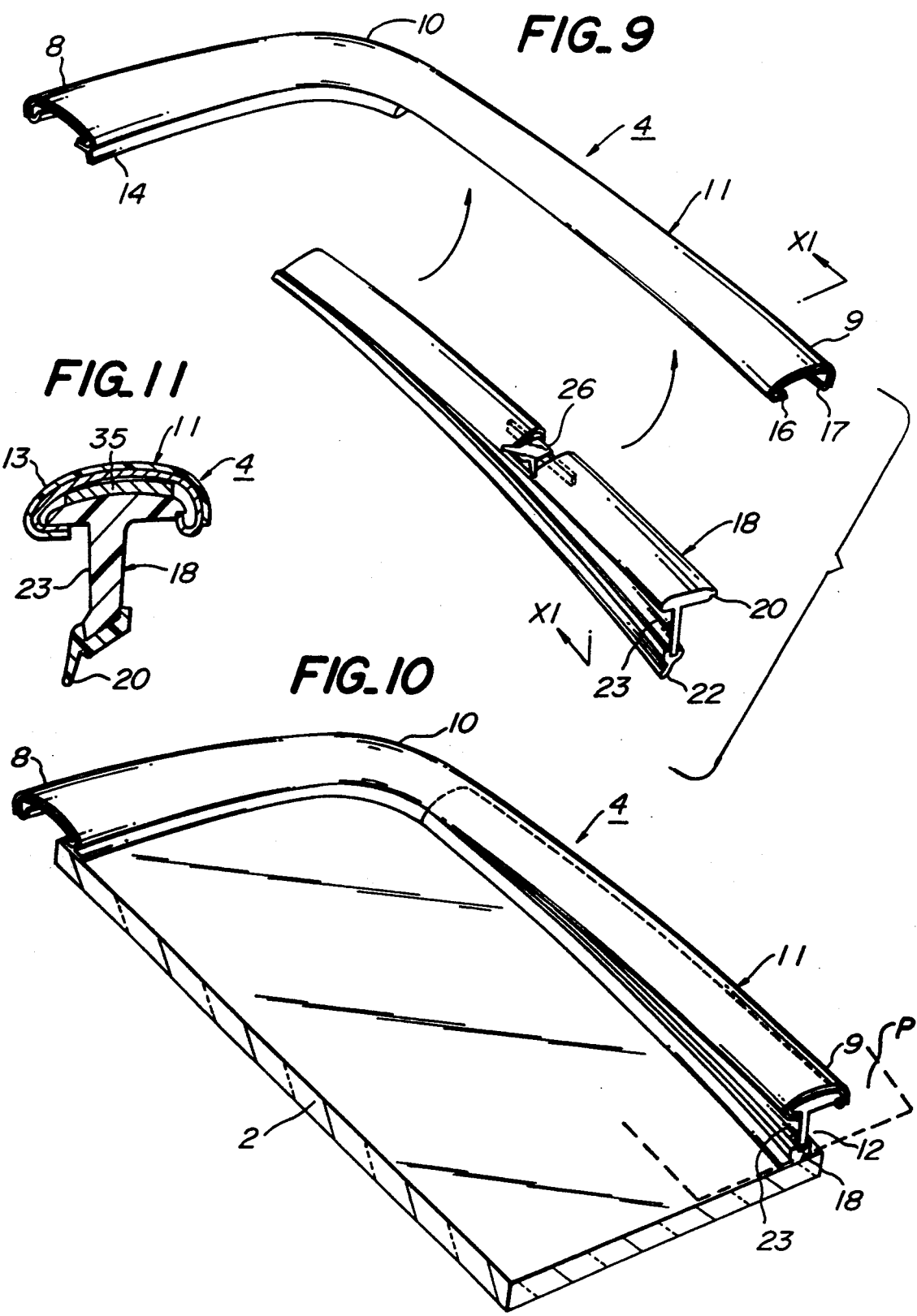

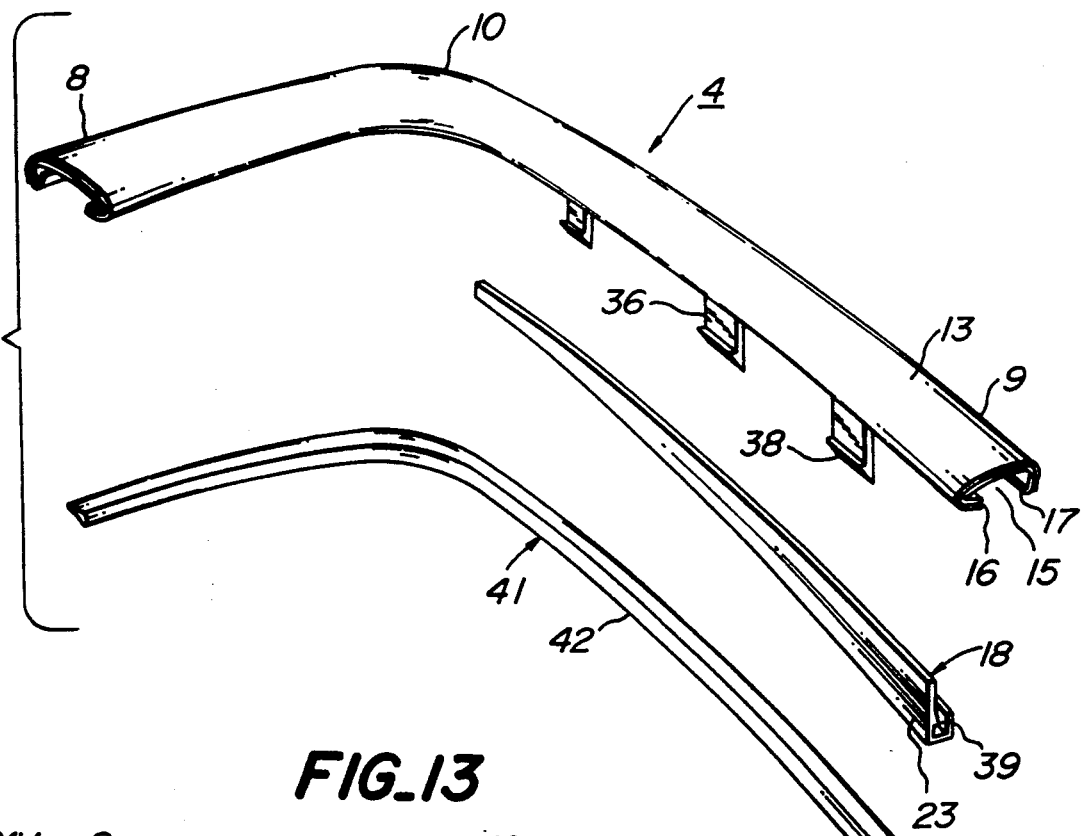
FIG_12
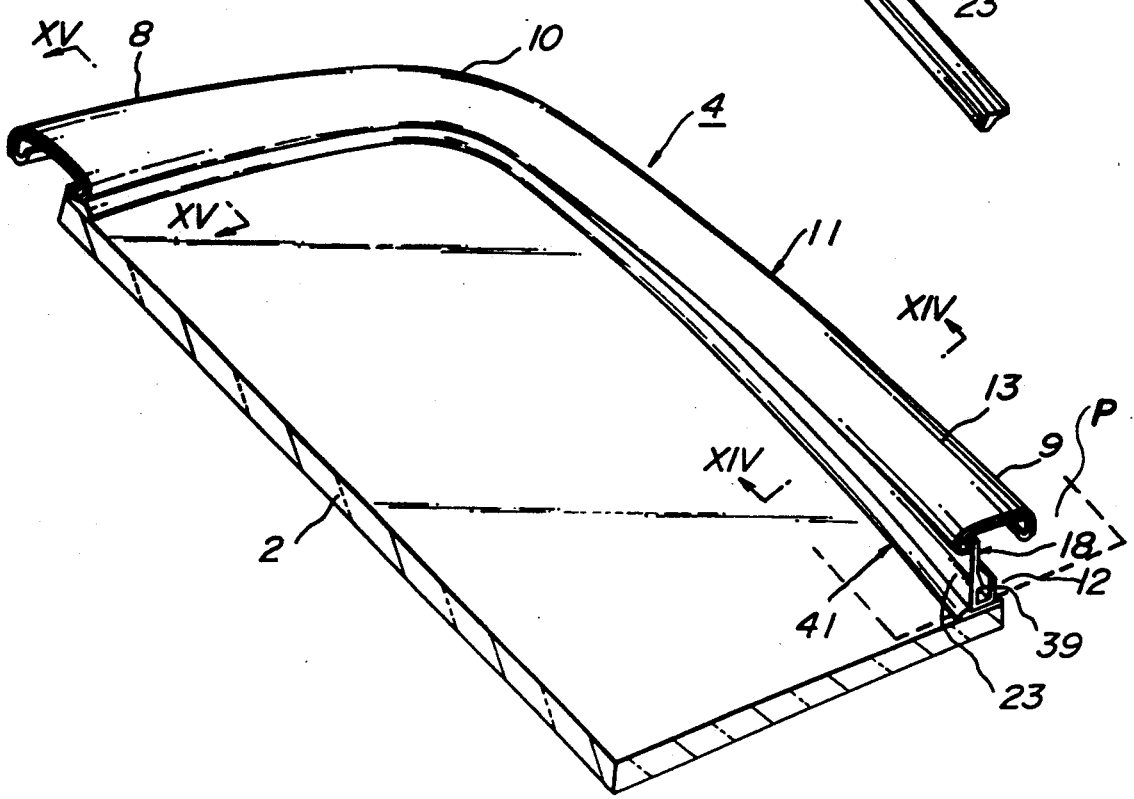
FIG_13

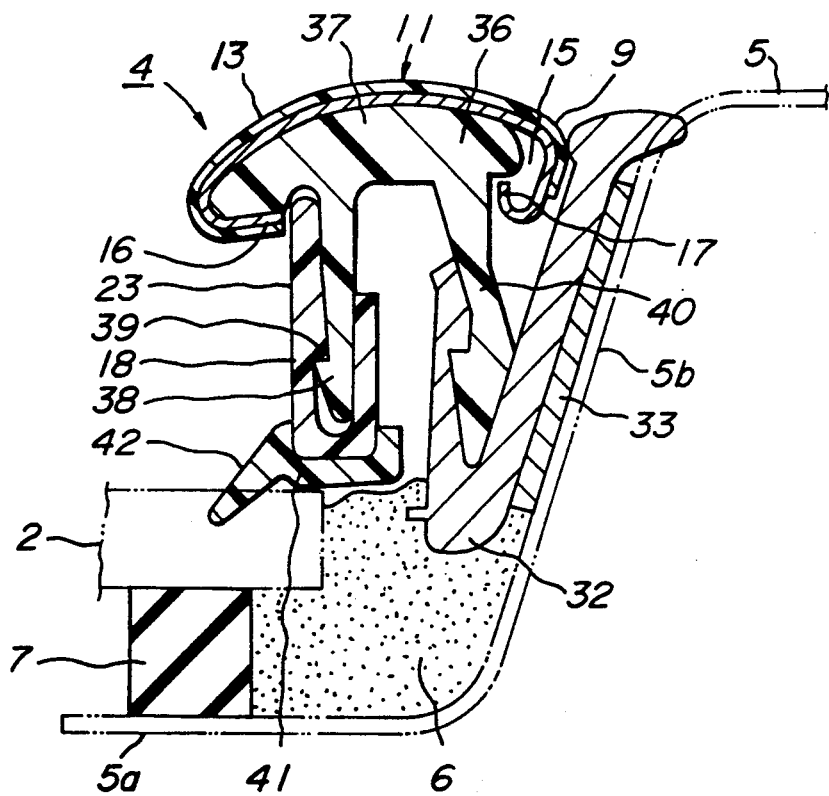
FIG_14
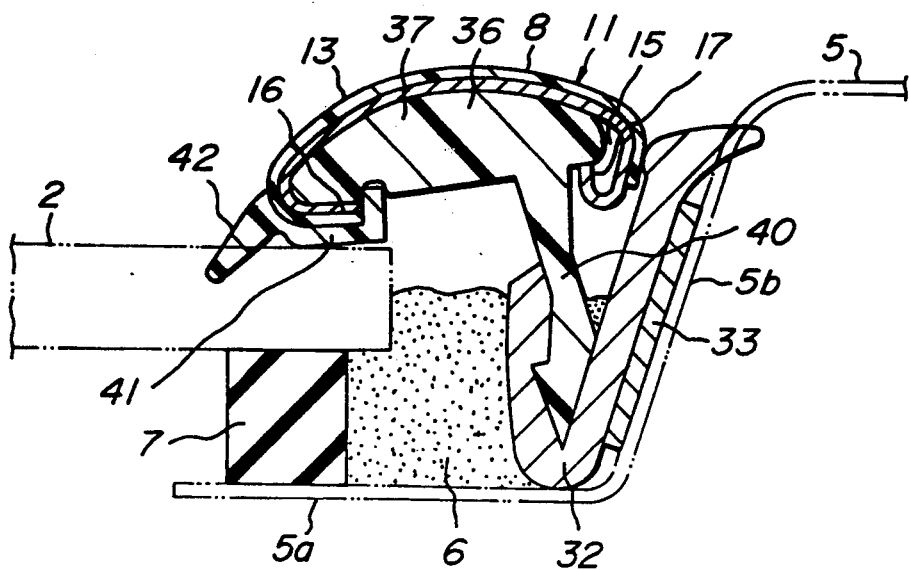
FIG_15

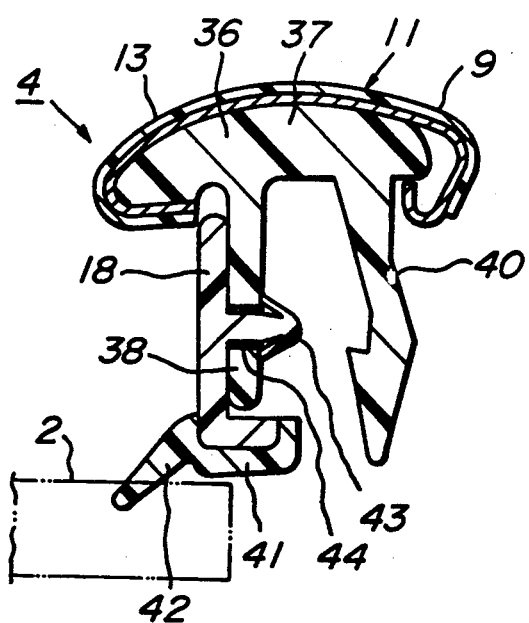
FIG_16

FIG_17
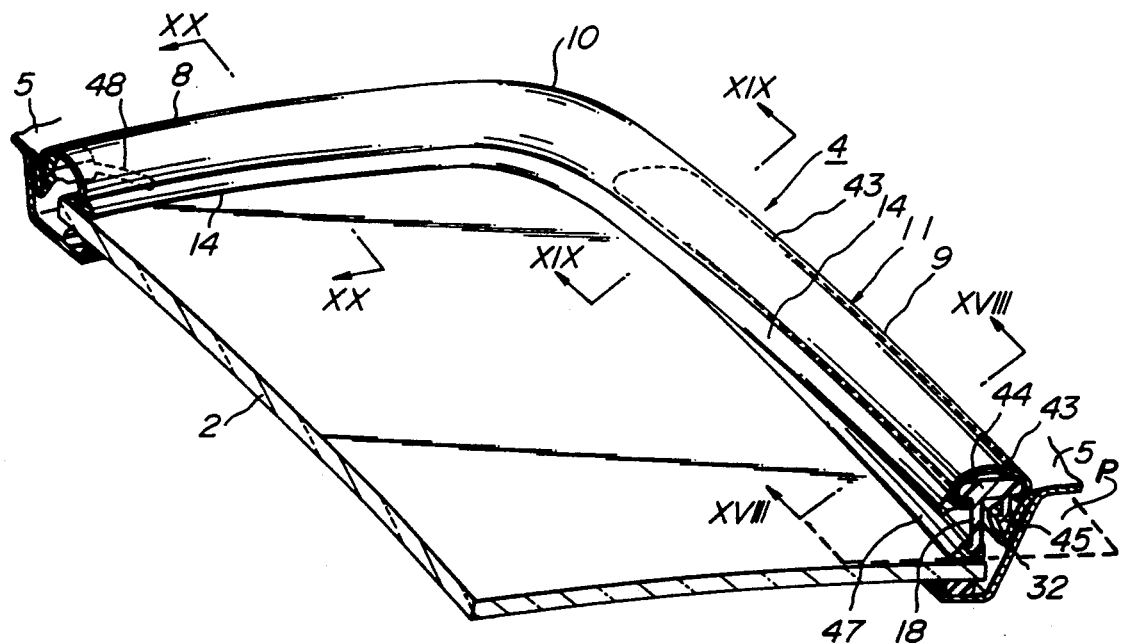
FIG_18
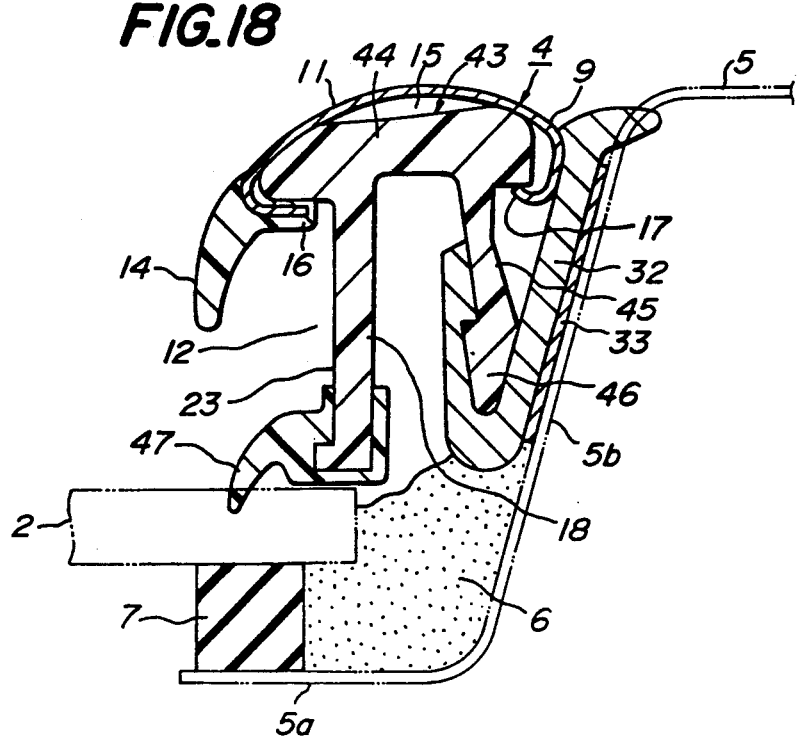

FIG_21
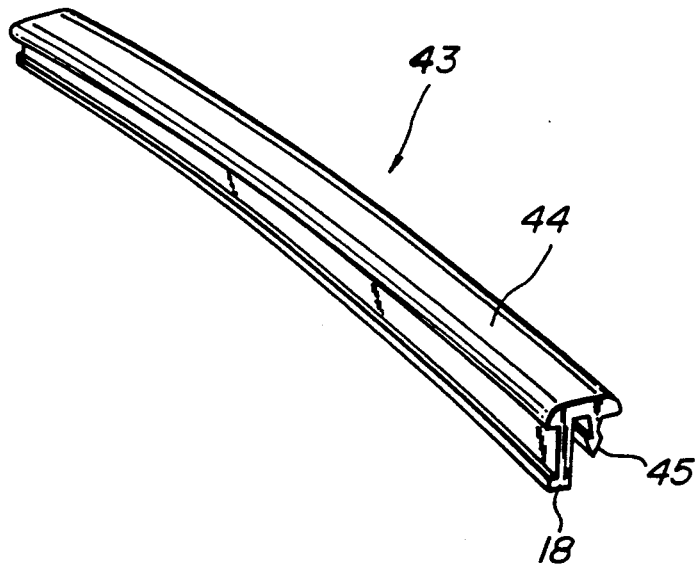
FIG_22
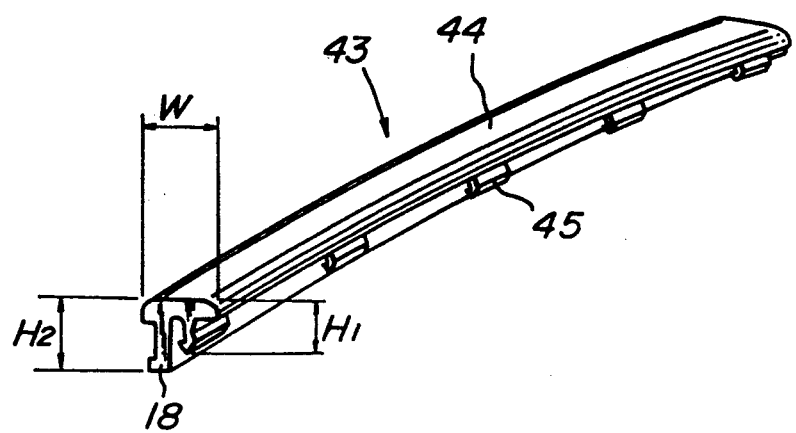

AUTOMOBILE WINDOW MOLDING ASSEMBLY

This application is a continuation of application Ser. No. 07/623,500, filed Dec. 7, 1990, now abandoned.

BACKGROUND OF THE INVENTION

1. Field of the Invention

The present invention relates to a molding assembly for an automobile window plate, which includes an elongate ornamental molding member or trimming member secured to the automobile body panel to cover a gap between the body panel and upper and side edges of the window plate.

2. Description of the Related Art

An automobile generally employs various kinds of window molding members which extend along the periphery of front or rear window plate, i.e. along a pair of front or rear pillars and the front or rear edge of the roof panel of the automobile body. The window molding member typically includes upper and side portions to extend along the upper and side edges of a window plate, respectively, and a corner portion between the upper and side portions for connecting them with each other.

A variety of requirements are imposed on window molding members mainly from design and/or functional viewpoint. For example, Japanese Utility Model Application Publication No. 57-54,416 discloses a window molding member including a profiled metal body whose tip end is provided with a ridge composed of appropriate synthetic resin material. The ridge defines a weir which serves, during driving in rainy conditions, to prevent rain water on the window plate from flowing across the side portion of the molding member toward the side window, thereby preserving the driver's and/or navigator's sight through the side windows. However, the ridge along the upper portion of the molding member disturbs formation of a so-called flush outer surface of the automobile body along the front edge of the roof panel, i.e. along the upper portion of the molding member.

This led to an increased demand in the automobile industry for a much improved window molding member whose cross-sectional shape varies in the longitudinal direction as disclosed, inter alia, in Japanese Utility Model Application Laid-open Publication No. 63-184,117 and U.S. Pat. Nos. 4,757,659 and 4,757,660 to Miyakawa et al. Such a molding member is essentially composed of an extruded synthetic resin body including an upper portion of a first predetermined cross-section for achieving a flush outer surface of the automobile body along the upper portion, and at least one side portion of a second predetermined cross-section for defining the weir.

From ornamental viewpoint, it is sometimes desirable to use a molding member composed of a profiled metal member, though formation of the weir along the side portion while achieving a flush outer surface along the upper portion generally necessitates deformation of the metal member, which is often difficult without the sacrifice of a refined appearance of the molding member in its smoothness and continuity at the corner portion between the upper and side portions. This is particularly the case when the automobile body panel at the side portion is significantly higher than the body panel at the upper portion.

SUMMARY OF THE INVENTION

Therefore, it is an object of the present invention to provide an improved automobile window molding assembly, which affords a weir along the side portion while achieving a flush outer surface along the upper portion, including an elongate ornamental member composed of a profiled metal member with a refined appearance in smoothness and continuity at the corner portion despite difference in height of the automobile body panel at the upper and side portions.

To this end, according to the present invention, there is provided an automobile window molding assembly comprising: an elongate outer ornamental member or trimming member formed of a profiled metal member which is adapted to cover a gap between an automobile body panel and upper and side edges of a window plate mounted on the body panel; said ornamental member including upper and side portions to extend along the upper and side edges of a window plate, respectively, and a corner portion between the upper and side portions for integrally connecting them with each other; said ornamental member having such a predetermined profile that, when the assembly is mounted in place, the ornamental member is in abutment with an outer surface of the window plate along the upper portion while it is spaced from the outer surface of the window plate along the side portion; fastener means for securing the ornamental member to the body panel; and a weir member secured to the ornamental member along the side portion to define a weir between the outer surface of the window plate and the ornamental member along the side portion.

In the automobile window molding assembly according to the present invention, the profiled metal member forming the outer ornamental member or trimming member may be composed of a stainless steel sheet, aluminum sheet or the like, which has been subjected to bending by a roll forming machine into the desired cross-section, for example, or it may be a rod of aluminum or the like metal which has been extruded into the desired cross-section. If necessary or desired, such a profiled metal member may be supplied to an extrusion die to be coextruded with a synthetic resin, or it may be fixedly connected to an elongate shaped body of a synthetic resin. The weir member secured to the ornamental member to define the weir may be composed of either a similar profiled metal member or a shaped body of a synthetic resin.

BRIEF DESCRIPTION OF THE DRAWINGS

FIG. 2 is an exploded perspective view of the window molding assembly according to one preferred embodiment of the present invention;

FIG. 3 is a perspective view of the window molding assembly of FIG. 2, which is mounted in place;

FIGS. 5, 6 and 7 are cross-sectional views taken along the lines V—V, VI—VI and VII—VII in FIG. 4, respectively;

FIG. 8 is a cross-sectional view showing the upper portion of the assembly of FIG. 1;

FIG. 9 is an exploded perspective view of the window molding assembly according to another embodiment of the present invention;

FIG. 10 is a perspective view of the window molding assembly of FIG. 9, which is mounted in place;

FIG. 11 is a cross-sectional view taken along the line XI—XI in FIG. 9;

FIG. 12 is an exploded perspective view of the window molding assembly according to another embodiment of the present invention;

FIG. 13 is a perspective view of the window molding assembly of FIG. 12, which is mounted in place;

FIGS. 14 and 15 are cross-sectional views taken along the lines XIV—XIV and XV—XV in FIG. 13, respectively;

FIG. 16 is a cross-sectional view similar to FIG. 14, showing a modification of the window molding assembly of FIGS. 12 to 15;

FIG. 17 is a perspective view of the window molding assembly according to still another embodiment of the present invention, which is mounted in place;

FIGS. 18, 19 and 20 are cross-sectional views taken along the lines XVIII—XVIII, XIX—XIX and XX—XX, respectively;

FIGS. 21 and 22 are perspective views showing the fastener member in the embodiment of FIG. 17;

DETAILED EXPLANATION OF THE PREFERRED EMBODIMENTS

Figure 1:
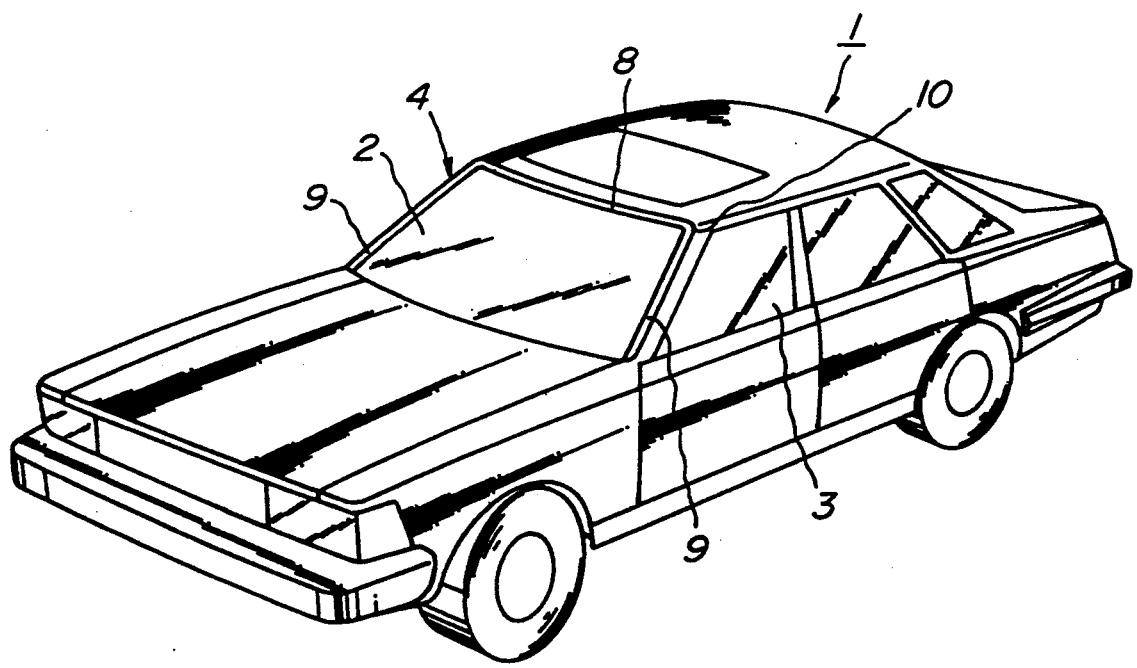
FIG. 1 is a perspective view of an automobile which includes a window molding assembly according to the present invention.
Figure 4:
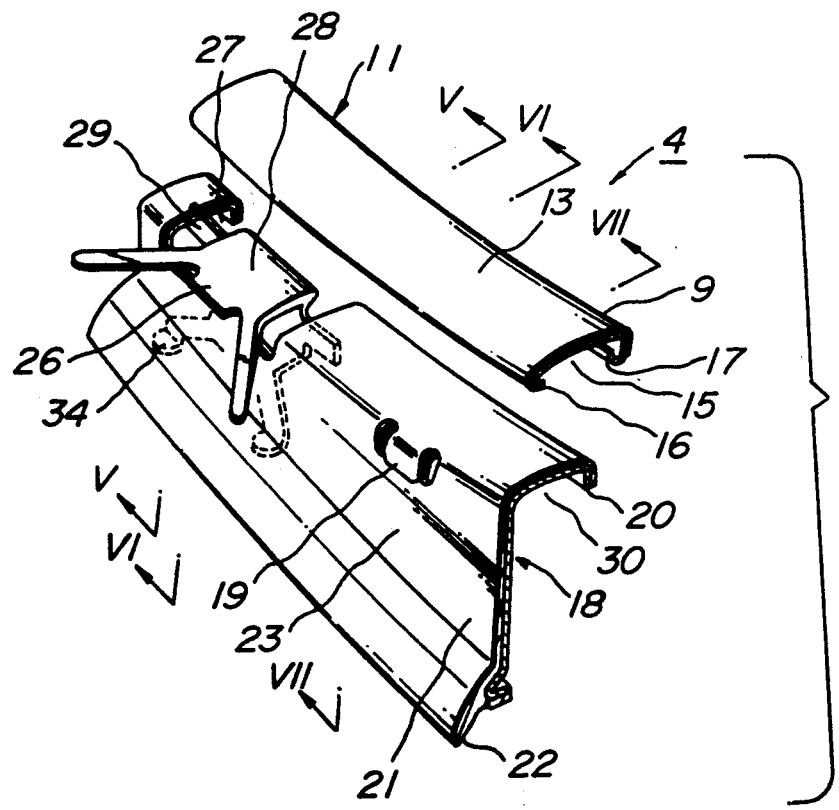
FIG. 4 is an exploded perspective view showing the side portion of the assembly of FIG. 1 in an enlarged scale.

The present invention will now be explained in further detail by referring to some preferred embodiments shown in the attached drawings, wherein the same reference numerals are used to denote the same or functionally equivalent components.

There is shown in FIG. 1 an automobile which is designated as a whole by reference numeral 1, and which includes a front window plate 2 and side window plates 3. The front window plate 2 may be composed of a transparent inorganic glass or transparent synthetic resin, such as polycarbonate resin, acrylic resin or the like, and is associated with a window molding assembly 4 to which the present invention is applied.

Figure 5:
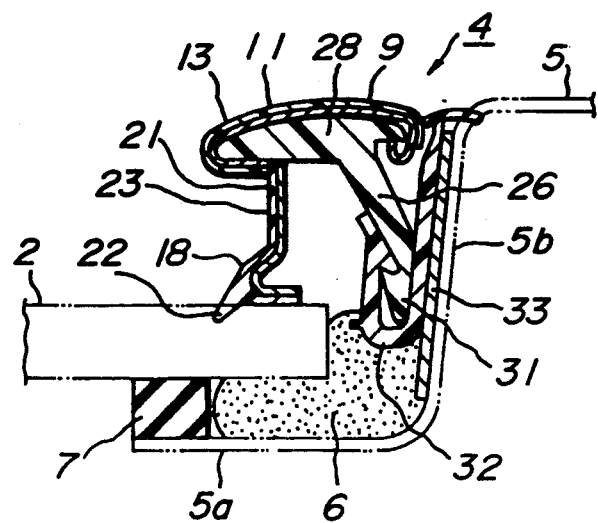
Figure 19:
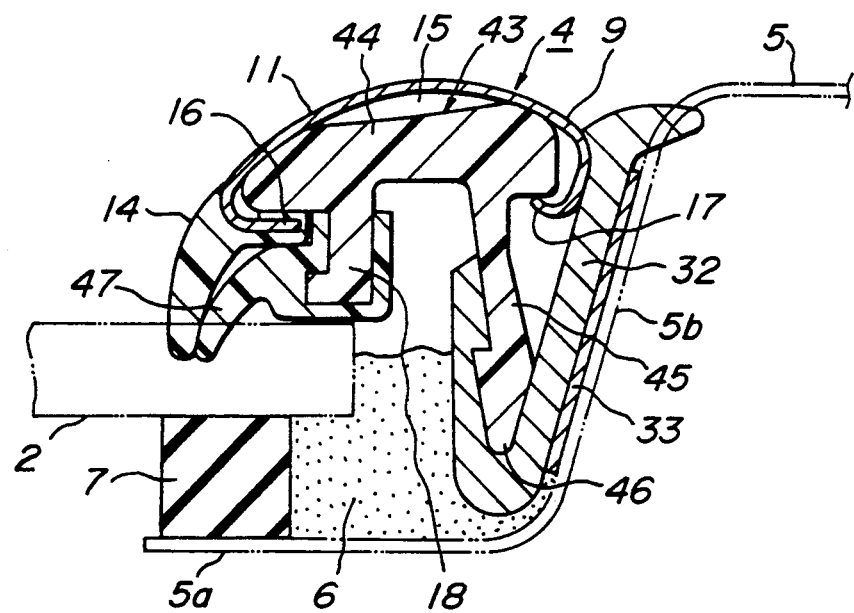
Figure 20:
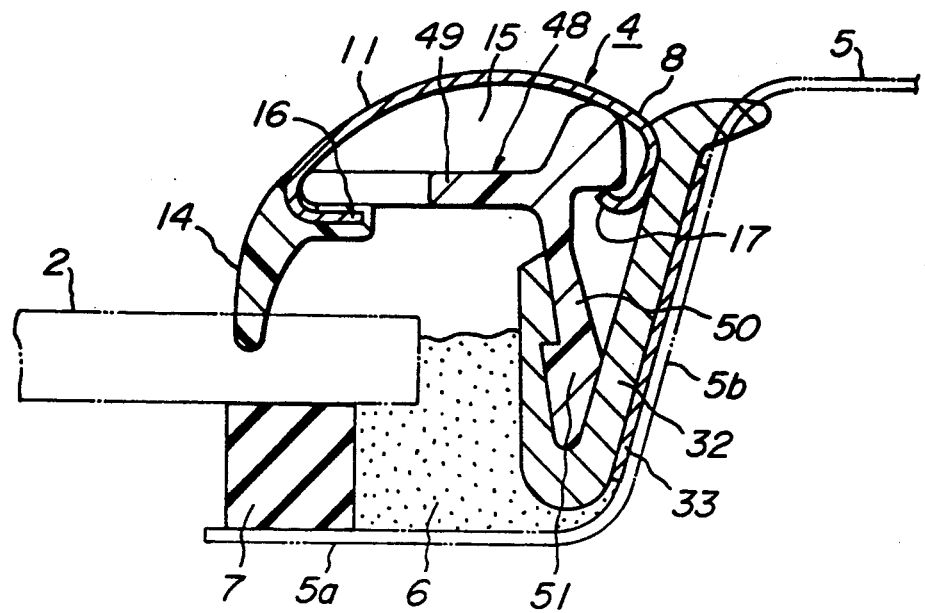
Figure 23:
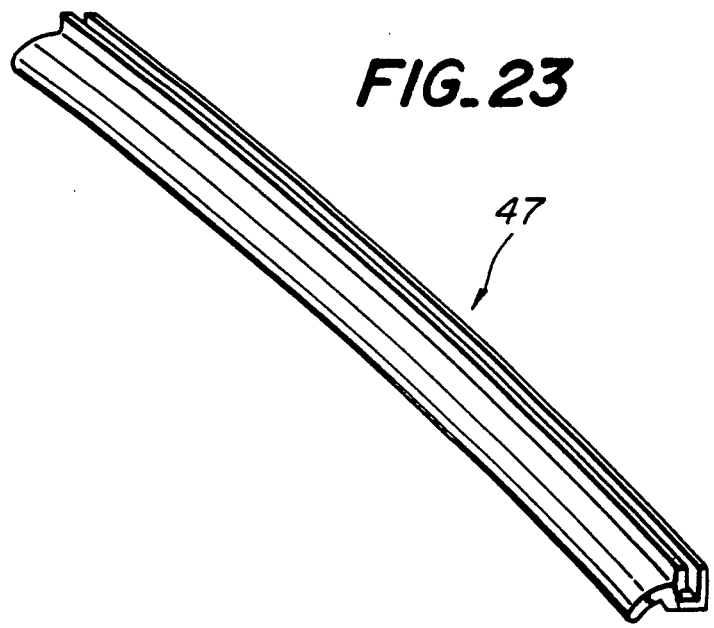
FIG. 23 is a perspective view showing the cushion element in the embodiment of FIG. 17.

As particularly shown in FIGS. 5, 6 and 8, the window molding assembly 4 is arranged to cover a gap between the automobile body panel 5 and the peripheral edge of the front window plate 2. The front window plate 2 is secured to a depressed flange or seat portion 5a of the body panel 5 by means of an adhesive material 6, with a rubber dam member 7 between the window plate 2 and the seat portion 5a of the body panel 5. The window plate 2 may be provided on its rear surface with an opaque printed layer extending along the periphery of the plate 2 to visually conceal the adhesive material 6 and the dam member 7 from outside and thereby realize a refined appearance.

The molding assembly 4 of the embodiment illustrated in FIGS. 2 to 8 consists of an upper portion 8 and side portions 9 extending along the upper and side edges of the window plate 2, respectively, and corner portions 10 for integrally connecting the upper and side portions 8, 9 with each other. In this connection, the body panel 5 has a height which is higher at the side portions 9 than at the upper portion 8, as appreciated from a comparison of FIGS. 5 and 6 with FIG. 8.

The molding assembly 4 includes an outer ornamental member or trimming member 11 in the form of an elongate profiled metal member, having an imaginary reference plane which corresponds to the outer surface of the window plate 2. The profiled metal member forming the outer ornamental member 11 is composed of a stainless steel sheet, aluminum sheet or the like, which has been subjected to bending by a roll forming machine into the desired cross-section. Alternatively, the ornamental member 11 may be a rod of aluminum or the like, which has been extruded into the desired cross-section.

The ornamental member 11 is bent outwardly at or near the corner portion 10 away from the above-mentioned reference plane, so that it is in abutment with the outer surface of the window plate 2 along the upper portion 8, and spaced from the window plate 2 along the side portions 9 to leave a clearance 12 therebetween. The ornamental member 11 has an outer surface with a laminated synthetic resin layer 13 thereon, which is provided with a lip 14 opposite to the window plate 2. The lip 14 extends along the upper and corner portions 8, 10 of the molding assembly, while it is not present along the side portions 9, e.g. by removal of material. The ornamental member 11 has a substantially C-shaped cross-section to form an interior space 15 therein, and is provided with retainer edges 16, 17 on both sides of the cross-section.

The molding assembly 4 further includes a weir member 18 for each side portion 9, which is composed of a profiled metal member of substantially L-shaped cross-section. The weir member 18 is provided with retainer elements 19, 20 which are engageable with the retainer edges 16, 17 of the ornamental member 11, respectively. The retainer element 19 of the weir member 18, which is engageable with the edge 16 of the ornamental member 11, may be a lug formed by locally pressing out the metal material of the weir member 18. On the other hand, the retainer element 20 of the weir member 18, which is engageable with the edge 17 of the ornamental member 11, may be a bent edge of a flange of the weir member 18. The weir member 18 has an outer surface with a laminated synthetic resin layer 21 thereon, which is provided with a lip 22 opposite to the window plate 2 to extend along the side portion 9 of the molding assembly.

When the weir member 18 is secured to the ornamental member 11 by engaging the retainer elements 19, 20 with the retainer edges 16, 17, respectively, another flange of the weir member 18 protrudes toward the window plate 2 and forms a desired weir 23 along the side portion 9 of the window molding assembly 1. Thus, the weir 23 fills the above-mentioned clearance 12 between the ornamental member 11 and the window plate 2. This clearance 12 is also filled by an end piece 24 of an integrally molded synthetic resin, as shown in FIG. 2, which is provided with a lip 25 and associated with the weir member 18 in the region between the side and corner portions 9, 10 of the window molding assembly 4. The end piece 24 is secured to the ornamental member 11 so that its lip 25 is aligned with the lips 14 of the ornamental member 11 and also with the lip 22 of the weir member 18. These lips 14, 22, 25 are resiliently brought into abutment with the outer surface of the window plate 2 when the molding assembly 4 is mounted in place.

The window molding assembly 4 further includes mounting clips 26 arranged within cutouts 27 which are formed in the weir members 18. Each clip 26 has a top 28 which is accommodated within the interior space 15 of the ornamental member 11 in engagement with the retainer edges 16, 17, projection 29 received in the interior space 30 of the weir member 18 in engagement therewith, a leg 31 to be engaged with a fastener 32 fixedly secured, e.g. by means of an adhesive tape 33, to a stepped wall 5b of the automobile body panel 5 adjacent to the flange portion 5a, and another projection 34 in the form of extensions from the leg 31 so as to be engaged with the rear side of the window plate 2.

With the above-mentioned arrangement of the window molding assembly 4, the weir member 18 is secured to the ornamental member 11 by engaging the retainer elements 19, 20 with the retainer edges 16, 17, and the ornamental member 11 is then secured to the automobile body panel 5 by means of the clips 26 so as to cover a gap between the body panel 5 and the peripheral edge of the front window plate 2. On this occasion, the leg 31 of the clip 26 is brought into engagement with the fastener 32, with the head 28 of the clip 26 in engagement with both the ornamental member 11, and with the weir member 18 and the projections 29, 34 in engagement with the weir member 18 and the window plate 2, respectively. The molding assembly is thus firmly secured to the body panel 5 by means of the adhesive material 6.

In the mounted state of the window molding assembly 4, the ornamental member 11 is in abutment with the outer surface of the window plate 2 along the upper portion 8, and spaced from the window plate 2 along the side portions 9 so that the weir member 18 is in abutment with the outer surface of the window plate 2 along the side portion to form a weir 23 between the ornamental member 11 and the window plate 2. The weir 23 serves to guide and collect rain water on the window plate during driving in rainy conditions, to thereby prevent rain water from flowing across the side portion of the molding member toward the side window, and preserve the driver's and/or navigator's sight through the side windows.

Another embodiment of the window molding assembly according to the present invention is shown in FIGS. 9 to 11. This embodiment features an arrangement wherein the weir member 18 is formed integrally with the end piece 24 from a hard synthetic resin and provided with the lip 22 which is formed of a plasticized synthetic resin. The weir member 18 is secured to the ornamental member 11 with a cushion element 35 therebetween, which may be formed of a foamed material or adhesive material. Except for the above differences, the embodiment shown in FIGS. 9 to 11 is substantially the same in structure and function as the previous one.

Another embodiment of the window molding assembly according to the present invention is shown in FIGS. 12 to 15. This embodiment features an arrangement wherein the weir member 18 is secured to mounting clips 36 which, in turn, are secured to the ornamental member 14. More particularly, each mounting clip 36 includes a top 37 which is accommodated within the interior space 15 of the ornamental member 11 in engagement with the retainer edges 16, 17, a retainer projection 38 to be engaged with a longitudinally continuous recess 39 in the weir member 18, and a leg 40 to be engaged with the fastener 32 on the stepped wall 5b of the automobile body panel 5. There is provided a cushion element 41 to be opposed to the window plate 2, which is adhered to the lower surface of the ornamental member 11 along the upper and corner portions 8, 10 of the window molding assembly 4, and also to the lower end of the weir member 18 along the side portion 9. The cushion element 41 is provided with a lip 42 to be brought into abutment with the outer surface of the window plate 2.

As an alternative, slightly modified arrangement, as shown in FIG. 16, the weir member 18 may be provided with a plurality of resiliently deformable lugs 43 each inserted into, and engaged with a corresponding hole 44 in the retainer projection 38 of the mounting clip 36.

The arrangement of the window molding assembly 4 described with reference to FIGS. 12 to 16 makes it possible to mount the assembly in a facilitated manner, and to reduce the number of manufacturing steps of the assembly in that each mounting clip 36 achieves dual functions of securing the assembly to the automobile body panel and retaining the weir member in place. Except for the above differences, the embodiments shown in FIGS. 12 to 15 and FIG. 16 are substantially the same in structure and function as the previous embodiments.

Still another embodiment of the window molding assembly according to the invention is shown in FIGS. 17 to 25. This embodiment features an arrangement wherein the weir member 18 is formed integrally with fastener means for securing the molding assembly 4 to the automobile body panel 5. More particularly, as shown in FIGS. 21 and 22, there is provided an elongate fastener member 43 for each side portion 9 of the window molding assembly 4, which is composed of an appropriate hard synthetic resin with a required flexibility and rigidity, and which is integral with the weir member 18.

The fastener member 43 includes a head 44 of a substantially constant width W along its entire length, and a plurality of legs 45 of the same height $H_1$, which are suspended from the head 44 and spaced from each other by a predetermined distance in the longitudinal direction of the fastener member 43. Each leg 45 has a hook-like projection 46 which is to be engaged with the fastener 32 on the stepped wall 5b of the automobile body panel 5. As can be seen from FIGS. 18 to 20, the weir member 18 integral with the fastener member 43 has a height $H_2$ which gradually decreases toward its end to be arranged at, or adjacent to the corner portion 10, corresponding to the clearance 12 between the ornamental member 14 and the window plate 2. There is provided a cushion element 47 (FIG. 23) to be opposed to the window plate 2, which is secured to the lower end of the weir member 18 and provided with a lip to be brought into abutment with the outer surface of the window plate 2.

Figure 24:
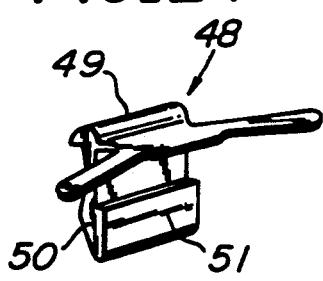
FIGS. 24 and 25 are perspective views showing the mounting clip in the embodiment of FIG. 17.
Figure 25:
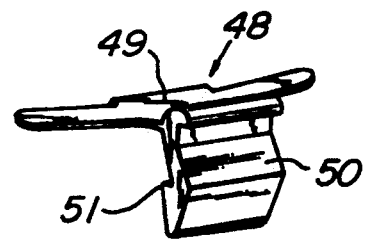

The window molding assembly 4 along its upper portion 8 is secured to the automobile body panel 5 by means of a plurality of mounting clips 48. As shown in FIGS. 24 and 25, each clip 48 includes a top 49 which is accommodated within the interior space 15 of the ornamental member 11 in engagement with the retainer edges 16, 17, and a leg 50 with a retainer projection 51 to be engaged with the fastener 32 fixedly secured to the stepped wall 5b of the automobile body panel 5.

Figure 26:
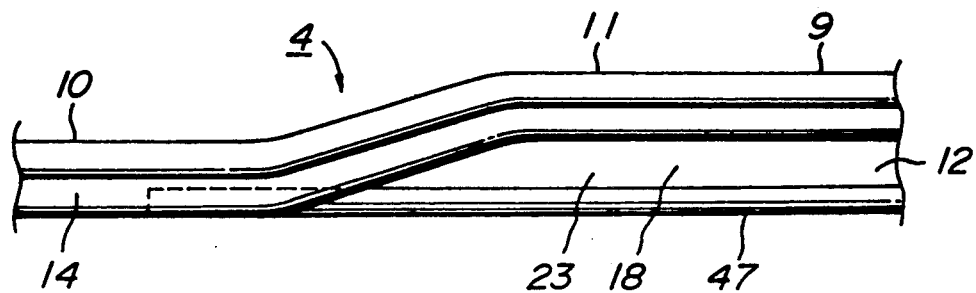
FIG. 26 is a fragmentary side view showing a modification of the window molding assembly of FIGS. 17 to 25.

In the above-mentioned embodiment of FIGS. 17 to 25, the clearance 12 between the ornamental member 11 and the window plate 2 along the side portion 9 is made to slightly decrease toward the corner portion 10, though this is not a prerequisite condition. Thus, as shown in FIG. 26, the ornamental member 11 may be subjected to such bending that the clearance 12 changes abruptly near the corner portion 10.

The arrangement of the window molding assembly 4 described with reference to FIGS. 17 to 26 makes it possible to mount the assembly in a further facilitated manner, and to reduce the number of components and manufacturing steps in that the fastener member 43 for securing the window molding assembly 4 to the automobile body panel 5 is integral with the weir member 18. Except for the above differences, the embodiments shown in FIGS. 17 to 25 and FIG. 26 are substantially same in structure and function as the previous embodiments.

It will be readily appreciated from the foregoing description that the present invention provides an improved automobile window molding assembly, which includes an elongate ornamental member composed of a profiled metal member with a refined appearance in smoothness and continuity at the corner portion despite difference in height of the automobile body panel at the upper and side portions.

While the present invention has been explained with reference to certain specific embodiments, which were given by way of examples only, various modifications are possible without departing from the scope of the invention. For example, the ornamental member may have an imaginary reference plane P which corresponds to the outer surface of the window plate, and which is inclined by a predetermined angle relative to the outer surface of the automobile body panel along the side portion when the assembly is mounted in place, to make it readily possible to form the desired weir between the ornamental member and the window plate without requiring bending of the ornamental member so that it is spaced away from the window plate.

What is claimed is:

1. An automobile window molding assembly comprising:
   an elongate trimming member formed of a profiled metal member for covering a gap between an automobile body panel and upper and side edges of a window plate mounted on the body panel;
   said trimming member including upper and side portions to extend along the upper and side edges of the window plate, respectively, and a corner portion between said upper and side portions for integrally connecting them with each other;
   said trimming member having a profile with an inwardly projecting lip such that, when the assembly is mounted in place, the lip of the trimming member abuts an outer surface of the window plate along said upper portion, and the lip of the trimming member is spaced from the outer surface of the window plate along said side portion by a predetermined distance;
   said trimming member having a location at or near said corner portion, where the lip of the trimming member begins to be spaced from the outer surface of the window plate, said predetermined distance increasing at least locally from said location of the trimming member in its longitudinal direction away from said upper portion;
   a weir member formed separately from the trimming member and secured to the trimming member to extend from said location of the trimming member and along said side portion, for defining a weir between the outer surface of the window plate and the trimming member along said side portion;
   said weir member having a height as measured from the outer surface of the window plate, which substantially corresponds to said predetermined distance; and
   fastener means formed separately from the trimming member, for securing the trimming member to the body panel.

2. The window molding assembly as set forth in claim 1, wherein said trimming member has a rear surface to which said weir member is secured.

3. The window molding assembly as set forth in claim 2, wherein said rear surface of the trimming member along said side portion has retainer regions which are engageable with said weir member for retaining it in place.

4. The window molding assembly as set forth in claim 1, wherein said weir member is secured to said fastener means.

5. The window molding assembly as set forth in claim 1, wherein said weir member is formed integrally with said fastener means.

6. The window molding assembly as set forth in claim 1, wherein said trimming member has an imaginary reference plane which corresponds to the outer surface of the window plate, and which is inclined by a predetermined angle relative to outer surface of said body panel along said side portion when the assembly is mounted in place, to realize said predetermined profile.

7. The window molding assembly as set forth in claim 1, wherein said trimming member has an imaginary reference plane which corresponds to the outer surface of the window plate, said trimming member being outwardly bent adjacent to said corner portion and away from said reference plane, to realize said predetermined profile.

8. The window molding assembly as set forth in claim 1 in which the trimming member is generally shaped in cross section in the form of a "U" of a "C".

* * * * *